US012225029B2

(12) United States Patent
Smith et al.

(10) Patent No.: US 12,225,029 B2
(45) Date of Patent: Feb. 11, 2025

(54) AUTOMATIC IDENTIFICATION OF ALGORITHMICALLY GENERATED DOMAIN FAMILIES

(71) Applicant: IronNet Cybersecurity, Inc., McLean, VA (US)

(72) Inventors: Nicholas Todd Smith, Placentia, CA (US); Peter Adelman, Alexandria, VA (US)

(73) Assignee: IronNet Cybersecurity, Inc., McLean, VA (US)

( * ) Notice: Subject to any disclaimer, the term of this patent is extended or adjusted under 35 U.S.C. 154(b) by 111 days.

(21) Appl. No.: 17/739,318

(22) Filed: May 9, 2022

(65) Prior Publication Data
US 2023/0362179 A1 Nov. 9, 2023

(51) Int. Cl.
*H04L 9/40* (2022.01)
(52) U.S. Cl.
CPC .............................. *H04L 63/1425* (2013.01)
(58) Field of Classification Search
CPC ............. H04L 63/1425; H04L 63/1416; H04L 63/1408
See application file for complete search history.

(56) References Cited

U.S. PATENT DOCUMENTS

| | | | |
|---|---|---|---|
| 11,503,044 B2 * | 11/2022 | Kislitsin | ............. H04L 63/1416 |
| 2014/0101759 A1 | 4/2014 | Antonakakis | |
| 2015/0264070 A1 | 9/2015 | Harlacher | |

(Continued)

FOREIGN PATENT DOCUMENTS

CN 114189390 A * 3/2022

OTHER PUBLICATIONS

J. Ahmed, H. H. Gharakheili, Q. Raza, C. Russell and V. Sivaraman, "Real-Time Detection of DNS Exfiltration and Tunneling from Enterprise Networks," 2019 IFIP/IEEE Symposium on Integrated Network and Service Management (IM), Arlington, VA, USA, 2019, pp. 649-653. (Year: 2019).*

(Continued)

*Primary Examiner* — Jeffrey Nickerson
*Assistant Examiner* — Adam Edward Shaughnessy
(74) *Attorney, Agent, or Firm* — Fitch, Even, Tabin & Flannery LLP

(57) ABSTRACT

According to the present disclosure, network security systems (e.g., network security algorithms) may uniquely identify an underlying algorithm and configuration used to produce domain names. For instance, network security techniques described herein may consider a collection of fully-qualified domain names (FQDNs) (e.g., taken from related network traffic data) and produce a value that can serve to uniquely identify the underlying generating algorithm and configuration used to produce the collection of FQDNs. In some examples, such may include implementation of statistical techniques to capture characteristic information about the amount of randomness, length, and distribution of characters in the collection of FQDNs. In some aspects, values of the characteristic information are adjusted based on a determined set of precision parameters. In some aspects, a single value may be produced, which can then be stored for later use in comparing with other values produced from some subsequent collection of FQDNs.

21 Claims, 6 Drawing Sheets

(56) References Cited

U.S. PATENT DOCUMENTS

| | | |
|---|---|---|
| 2016/0255107 A1 | 9/2016 | Qian |
| 2017/0026390 A1* | 1/2017 | Sofka |
| 2019/0089721 A1* | 3/2019 | Pereira .................. G06F 16/951 |
| 2021/0099414 A1 | 4/2021 | Liu |
| 2021/0218762 A1* | 7/2021 | Pereira ................ H04L 61/4511 |

OTHER PUBLICATIONS

Almashhadani et al; "MaldomDetector: A System for Detecting Algorithmically Generated Domain Names with Machine Learning"; Computers and Security 93 (2020); Mar. 12, 2020; 13 pages.
Cheng et al; "Detecting Domain Generation Algorithms Based on Reinforcement Learning"; 2019 International Conference on Cyber-Enabled Distributed Computing and Knowledge Discovery (CyberC); IEEE Computer Society; 2019; pp. 261-264.
PCT; International Search Report and Written Opinion of the International Searching Authority for International Application No. PCT/US2023/020893 mailed Aug. 14, 2023.

* cited by examiner

AUTOMATIC IDENTIFICATION OF ALGORITHMICALLY GENERATED DOMAIN FAMILIES

BACKGROUND OF THE INVENTION

1. Field of the Invention

The present invention relates generally to network security, and more specifically to automatic identification of algorithmically generated domain families.

2. Discussion of the Related Art

Various systems and processes are known in the art for automatic identification of algorithmically generated domain families.

Network security generally refers to practices, processes, and polices adopted to detect, monitor, and prevent unauthorized access, modification, misuse, or denial of a computer network (e.g., and network-accessible resources). For instance, network security may include the authorization of access to data in a network (e.g., where authorization of access may be controlled by network security policies, a network administrator, etc.).

Some cyber-attacks (e.g., such as botnets and ransomware) may rely on Command and Control (C2) channels to conduct malicious activities remotely. To avoid channel detection, cyber-attacks may implement covert communication techniques, such as algorithmically generated domains (AGDs), which allows malware to generate numerous domain names (e.g., until its corresponding C&C server is found by malware). As such attacks may be resilient to detection via conventional network security approaches, there is a need in the art for improved network security techniques and improved network security systems.

SUMMARY

A method, apparatus, non-transitory computer readable medium, and system for automatic identification of algorithmically generated domain families are described. One or more aspects of the method, apparatus, non-transitory computer readable medium, and system include collecting a first plurality of fully-qualified domain names from first related network traffic via a computer network; generating a fingerprint indicative of a generation algorithm, wherein the fingerprint is generated as a function of length, randomness, and character distribution of the first plurality of fully-qualified domain names and utilizing a set of precision parameters; storing the fingerprint in a database and associating the fingerprint with the first related network traffic; detecting a second plurality of fully-qualified domain names from second related network traffic via the computer network; detecting whether the fingerprint correlates to a value generated as a function of length, randomness, and character distribution of the second plurality of fully-qualified domain names and utilizing the set of precision parameters; and signaling when the fingerprint correlates to the value.

An apparatus, system, and method for automatic identification of algorithmically generated domain families are described. One or more aspects of the apparatus, system, and method include a database storing a fingerprint and associating the fingerprint with first related network traffic from a computer network; a computer network interface coupled to a plurality of fully-qualified domain names from second related network traffic on the computer network; and a processor coupled to the computer network interface and comprising a code segment for performing the following steps: detecting whether the fingerprint correlates to a value generated as a function of length, randomness, and character distribution of the plurality of fully-qualified domain names and utilizing a set of precision parameters; and signaling when the fingerprint correlates to the value.

A method, apparatus, non-transitory computer readable medium, and system for automatic identification of algorithmically generated domain families are described. One or more aspects of the method, apparatus, non-transitory computer readable medium, and system include detecting a plurality of fully-qualified domain names from related network traffic via a computer network; detecting whether a fingerprint correlates to a value generated as a function of length, randomness, and character distribution of the plurality of fully-qualified domain names and utilizing a set of precision parameters; and signaling when the fingerprint correlates to the value.

A method, apparatus, non-transitory computer readable medium, and system for automatic identification of algorithmically generated domain families are described. One or more aspects of the method, apparatus, non-transitory computer readable medium, and system include collecting a first plurality of fully-qualified domain names from first related network traffic via a computer network; generating a fingerprint indicative of a generation algorithm, wherein the fingerprint is generated as a function of length, randomness, and character distribution of the first plurality of fully-qualified domain names and utilizing a set of precision parameters; and storing the fingerprint in a database and associating the fingerprint with the first related network traffic.

DETAILED DESCRIPTION

Figure 1:
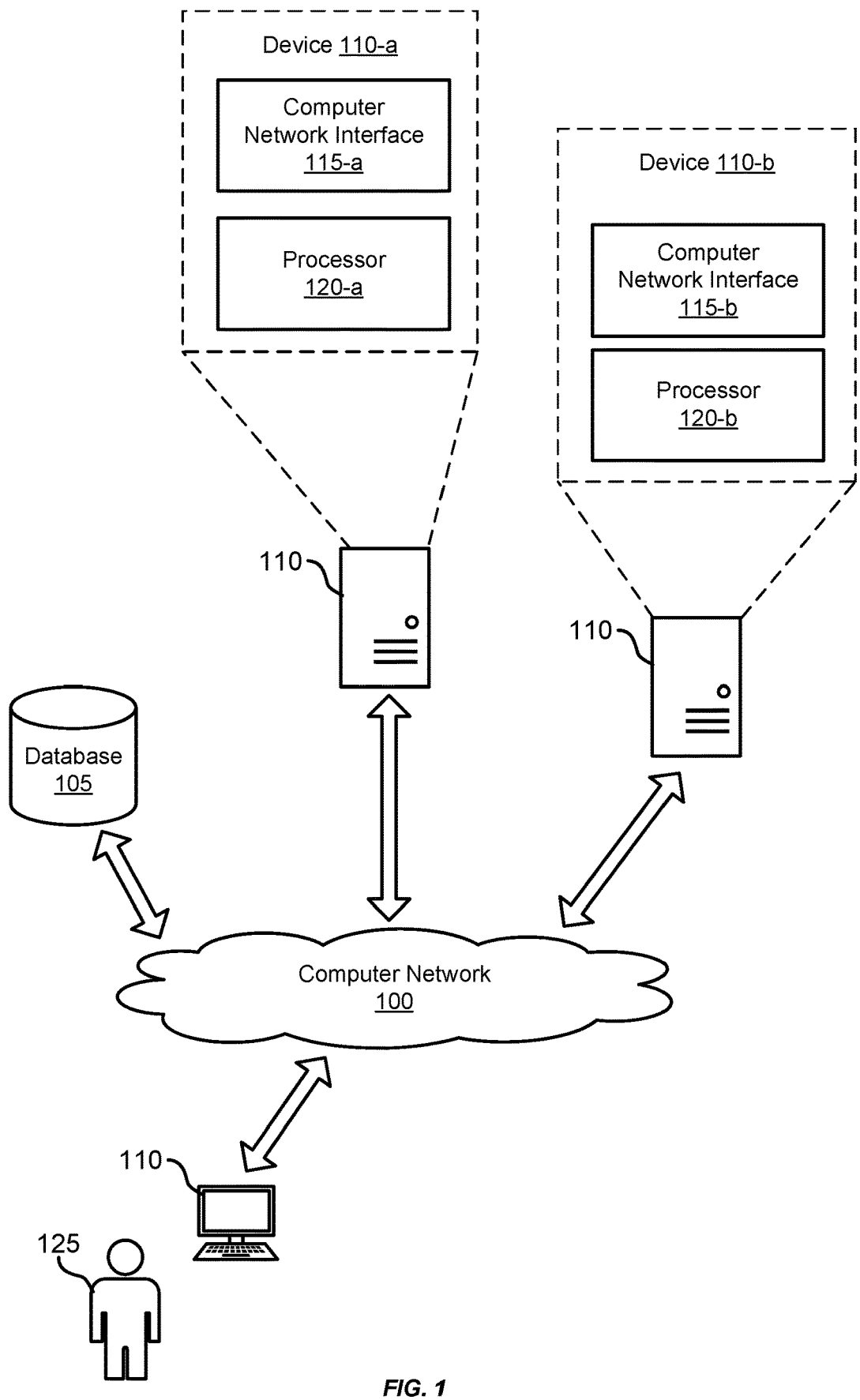
FIGS. 1 through 2 show example network security systems according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Malware may generally refer to any software intentionally designed to attack a computer network (e.g., such as software designed to leak private information, gain unauthorized access to information or systems, cause disruption to a computer, server, client, or computer network, etc.).

In some examples, malware may leverage the Domain Name Service (DNS) protocol to contact a command & control (C2) server. Two example malware approaches for such include DNS tunneling and domain generation algorithms (DGAs). DNS tunneling and DGAs may rely on algorithms to produce algorithmically generated domains (AGDs) with a configurable structure. Since attackers (e.g., cyber-attacks) may drastically alter the underlying generating process (e.g., and thus drastically alter the generated distribution of domains), network security systems and techniques that leverage historical data to identify specific families of AGDs operate at a disadvantage (e.g., and thus may be prone to network insecurities, cyber-attacks, etc.).

Due to the difficultly of determining if two AGDs are generated from the same underlying algorithm, existing network security systems may be inefficient or ineffective in handling such tasks. For instance, some network security techniques may attempt to solve a binary classification problem, such as: is this domain an AGD? However, conventional network security techniques fail to automatically and reliably group AGDs using an algorithm that is feasible (e.g., implementable, easily understandable, can be performed at scale in a stateless and distributed fashion, etc.).

Domain name composition comprises a plurality of characters in a string. Each domain name has a length consisting of the number of characters in the domain name. Each character in the domain name may be any type of character acceptable in a domain name. For example, a character in a domain name may be a digit character, an alphabetic character, or any other type of character acceptable in a domain name.

According to the present disclosure, network security systems (e.g., network security algorithms) may uniquely identify an underlying algorithm and configuration used to produce domain names (e.g., which may be used to determine whether two or more network events were produced from the same underlying generation process). For instance, network security techniques described herein may take, as input, a collection of fully-qualified domain names (FQDNs) (e.g., taken from related network traffic data, such as a source IP/destination IP pair). Further, a value may be produced that can serve to uniquely identify the underlying generating algorithm and configuration used to produce the collection of FQDNs. In some examples, such may include implementation of statistical techniques to capture characteristic information about the amount of randomness, length, and character distribution in the collection of FQDNs. In some aspects, a single value may be produced, which can then be stored in a database and associated with the network traffic for later retrieval (e.g., for later use in comparing with other values produced from some subsequent collection of FQDNs).

Accordingly, if other groups of different FQDNs are encountered (e.g., collected, detected, analyzed, etc.) later that produce a same or similar value, network security techniques may conclude with high probability that the two network events were produced from the same underlying generation process. Such techniques may further allow network security products to fingerprint attacks and share information about them.

FIG. 1 shows an example of a network security system according to aspects of the present disclosure. The example shown includes computer network 100, database 105, devices 110 (e.g., including example device 110-*a* and example device 110-*b*), and user 125.

Devices 110 may be examples of, or include aspects of, the corresponding element described with reference to FIG. 2. In one aspect, a device 110 may include a computer network interface 115 and a processor 120. For instance, in the example of FIG. 1, device 110-*a* includes computer network interface 115-*a* and processor 120-*a*, and device 110-*b* includes computer network interface 115-*b* and processor 120-*b*. A computer network interface 115 may be an example of, or include aspects of, the corresponding element described with reference to FIG. 2. A processor 120 may be an example of, or include aspects of, the corresponding element described with reference to FIG. 2.

Some cyber-attacks (e.g., malware) may avoid channel detection by implementing covert communication techniques, such as AGDs, which allows malware to generate numerous domain names for malicious network attacks. Such attacks may be resilient to detection via conventional network security approaches. For instance, correlating AGDs can be challenging, even when the domains are generated from the same underlying malware strain. This is due to the randomized component of AGDs, differences in AGD configuration parameters, temporal factors, etc.

As described in more detail herein, one or more aspects of the present disclosure produce mathematically derived labels for AGDs that can be used to automatically identify similar or identical strains of malware across network environments, time, and AGD configuration parameters. Network security systems (e.g., network security algorithms) may uniquely identify an underlying algorithm and configuration used to produce domain names (e.g., AGDs). For instance, network security techniques described herein may consider a collection of FQDNs and produce a value that can serve to uniquely identify the underlying generating algorithm and configuration used to produce the collection of FQDNs.

In some aspects, such produced values may be stored in a database 105 and associated with the network traffic for later retrieval (e.g., for later use in comparing with other values produced from some subsequent collection of FQDNs). One or more aspects of the techniques, described in more detail herein, may reliably correlate different groups of AGDs back to the original generating family.

An example system for automatic identification of algorithmically generated domain families is described. One or more aspects of the example system include a database 105, a computer network interface 115-*a*, and a processor 120-*a*. The database 105 may store a fingerprint and associate the fingerprint with first related network traffic from a computer network 100. The computer network interface 115-*a* may be coupled to a plurality of fully-qualified domain names from second related network traffic on the computer network 100. The processor 120-*a* may be coupled to the computer network interface 115-*a* and may include a code segment for performing the steps of: detecting whether the fingerprint correlates to a value generated as a function of length, randomness, and character distribution of the plurality of fully-qualified domain names; and signaling when the fingerprint correlates to the value.

In some embodiments the value generated as a function of length includes determining an average domain name length of the plurality of fully-qualified domain names. In other embodiments generating the fingerprint value as a function of length further includes determining an average domain name log-length of the plurality of fully-qualified domain names by calculating log 10(1+the average domain name length of said first plurality of fully-qualified domain names).

In some embodiments the value generated as a function of randomness includes determining an entropy over all domains of the first plurality of fully-qualified domain names. In other embodiments generating the fingerprint value as a function of randomness further includes dividing the entropy over all domains of the first plurality of fully-qualified domain names by a maximum possible entropy achievable.

In some embodiments the value generated as a function of character distribution includes determining a digit character ratio that reflects the prevalence of digit characters in the first plurality of fully-qualified domain names. In some embodiments the digit character ratio is determined by the steps of:

determining a number of digit characters, a number of non-digit characters, and a total number of characters in each of the first plurality of fully-qualified domain names; and calculating the digit character ratio equal to ((nc−nd)/(nc+nd)+1)/2, wherein nc is the total number of digit characters of the first plurality of fully-qualified domain names, and nd is the total number of non-digit characters of the first plurality of fully-qualified domain names.

In some aspects, the processor 120-a comprises the code segment for adjusting a granularity of the value. In some aspects, the processor 120-a comprises the code segment for generating the value by taking an entropy of the plurality of fully-qualified domain names in thousandths, digit character ratio measured in tenths, and log-length measured in thousandths.

Some examples of the system further include another computer network interface 115-b coupled to another plurality of fully-qualified domain names from the first related network traffic on the computer network 100. Some examples further include another processor 120-b coupled to the another computer network interface 115-b, where the another processor 120-b comprises another code segment code for generating the fingerprint indicative of a generation algorithm, wherein the fingerprint is generated as a function of length, randomness, and character distribution of the other plurality of fully-qualified domain names.

In some aspects, a processor 120 comprises the code segment for performing the additional steps of: determining a number of digit characters, a number of non-digit characters, and a total number of characters in each of the other plurality of fully-qualified domain names; determining a digit character ratio comprising ((nc−nd)/(nc+nd)+1)/2, wherein nc is the number of digit characters, and nd is the number of non-digit characters; determining an entropy over all domains of the other plurality of fully-qualified domain names, and dividing the entropy over all domains of the other plurality of fully-qualified domain names by a maximum possible entropy achievable; determining an average domain name length of the other plurality of fully-qualified domain names; determining an average domain name log-length by determining log 10(1+the average domain name length of the other plurality of fully-qualified domain names); and rounding the digit character ratio, the entropy, and the average domain name log-length according to predetermined precision parameters.

In some aspects, a processor 120 comprises the code segment for performing the additional step of determining a set of parameters, wherein the set of parameters are determined by: loading labeled training data comprising a group of fully-qualified domain names known to have been generated by a particular malware strain; looping over all possible parameter settings (n1=1 . . . 10, n2=1 . . . 10, n3=1 . . . 10); computing a respective label for each of the possible parameter settings; determining a percent of labels in the group not found in another group for each respective computed label; determining a percent of non-unique labels within the group for each respective computed label; determining a value H, where H=P*Q−0.01*log(n1+n2+n3) for each respective computed label, wherein P is the percent of labels in the group not found in the other group, and wherein Q is the percent of non-unique labels within the group; and preserving a parameter set (n1, n2, n3) that maximizes the value H.

In some aspects, the generating of the fingerprint (e.g., by the another processor 120-b) comprises generating the fingerprint in response to a stateless function call.

A computer network 100 may be configured to provide on-demand availability of computer system resources, such as data storage and computing power. In some examples, the computer network 100 provides resources without active management by the user 125. The term computer network 100 (e.g., or cloud) is sometimes used to describe data centers available to many users 125 over the Internet. Some large computer networks 100 may have functions distributed over multiple locations from central servers. A server is designated an edge server if it has a direct or close connection to a user 125. In some cases, a computer network 100 is limited to a single organization. In other examples, the computer network 100 is available to many organizations. In one example, a computer network 100 includes a multi-layer communications network comprising multiple edge routers and core routers. In another example, a computer network 100 is based on a local collection of switches in a single physical location.

A database 105 is an organized collection of data. For example, a database 105 stores data in a specified format known as a schema. A database 105 may be structured as a single database 105, a distributed database 105, multiple distributed databases 105, or an emergency backup database 105. In some cases, a database controller may manage data storage and processing in a database 105. In some cases, a user 125 interacts with a database controller. In other cases, a database controller may operate automatically without user interaction.

A server provides one or more functions to users 125 linked by way of one or more of the various networks. In some cases, the server includes a single microprocessor board, which includes a microprocessor responsible for controlling all aspects of the server. In some cases, a server uses microprocessor and protocols to exchange data with other devices 110/users 125 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

A device 110 may generally include any computing device, such as a personal computer, laptop computer, mainframe computer, palmtop computer, personal assistant, mobile device, a server, a computer network hardware device, or any other suitable processing apparatus.

Figure 2:
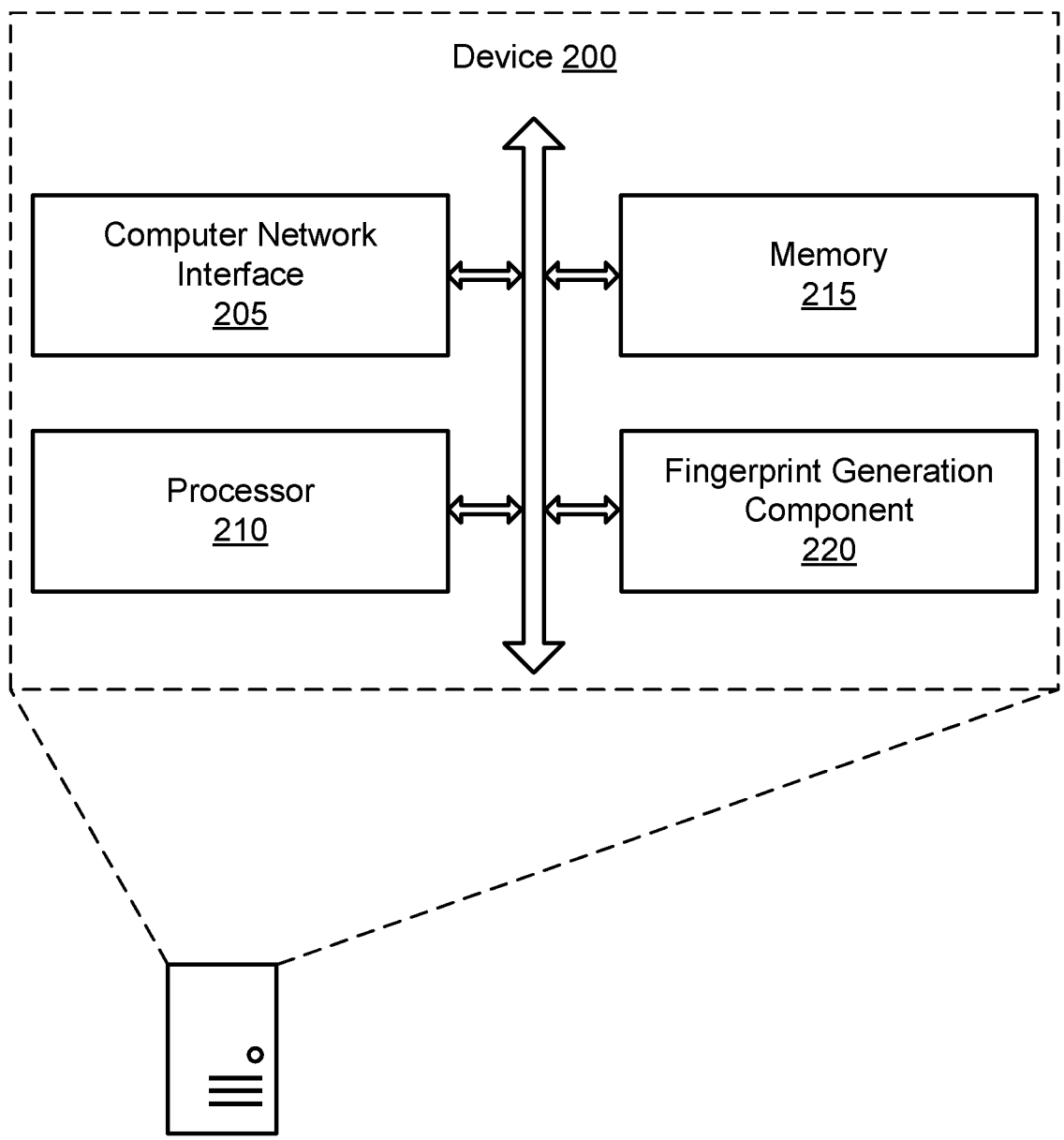

FIG. 2 shows an example of a network security system according to aspects of the present disclosure. Device 200 is an example of, or includes aspects of, the corresponding element described with reference to FIG. 1. For instance, device 200 may be an example of a user device 100, the example device 110-a, the example device 110-b, etc. For instance, in one aspect, device 200 includes computer network interface 205, processor 210, memory 215, and fingerprint generation component 220. Computer network interface 205 is an example of, or includes aspects of, the corresponding element described with reference to FIG. 1. Processor 210 is an example of, or includes aspects of, the corresponding element described with reference to FIG. 1. In some aspects, device 200 may implement (e.g., via computer network interface 205, processor 210, memory 215, and fingerprint generation component 220) a network security algorithm (e.g., described with reference to FIG. 3).

A processor 210 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 210 is configured to operate memory 215 (e.g., a memory array using a memory controller). In other cases, a memory controller is integrated into the processor 210. In some cases, the processor 210 is configured to execute computer-readable instructions stored in memory 215 to perform various functions. In some embodiments, a processor 210 includes special purpose components for modem processing, baseband processing, digital signal processing, or transmission processing.

Examples of a memory 215 device 200 include random access memory (RAM), read-only memory (ROM), or a hard disk. Examples of memory devices include solid state memory 215 and a hard disk drive. In some examples, memory 215 is used to store computer-readable, computer-executable software including instructions that, when executed, cause a processor 210 to perform various functions described herein. In some cases, the memory 215 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 215 store information in the form of a logical state.

According to some aspects (e.g., when device 200 is an example of device 110-b described with reference to FIG. 1), computer network interface 205 (e.g., computer network interface 115-a) collects a first set of fully-qualified domain names from first related network traffic via a computer network. In some examples, fingerprint generation component 220 generates a fingerprint indicative of a generation algorithm, where the fingerprint is generated as a function of length, randomness, and character distribution of the first set of fully-qualified domain names. In some examples, fingerprint generation component 220 and/or processor 210 stores the fingerprint in a database (e.g., database 105) and associates the fingerprint with the first related network traffic.

According to some aspects (e.g., when device 200 is an example of device 110-a described with reference to FIG. 1), computer network interface 205 (e.g., computer network interface 115-b) detects a second set of fully-qualified domain names from second related network traffic via the computer network. In some examples, fingerprint generation component 220 and/or processor 210 detects whether the fingerprint correlates to a value generated as a function of length, randomness, and character distribution of the second set of fully-qualified domain names. In some examples, processor 210 signals when the fingerprint correlates to the value.

In some examples, fingerprint generation component 220 adjusts a granularity of the value. In some examples (e.g., as described in more detail herein, for example, with reference to FIG. 3), fingerprint generation component 220 generates the value by taking an entropy of the second set of fully-qualified domain names in thousandths, digit character ratio measured in tenths, and log-length measured in thousandths.

In some aspects, fingerprint generation component 220 determines a number of digit characters, a number of non-digit characters, and a total number of characters in each of the first set of fully-qualified domain names; determines a digit character ratio including $((nc-nd)/(nc+nd)+1)/2$, where nc is the number of digit characters, and nd is the number of non-digit characters; determines an entropy over all domains of the first set of fully-qualified domain names, and dividing the entropy over all domains of the first set of fully-qualified domain names by a maximum possible entropy achievable; determines an average domain name length of the first set of fully-qualified domain names; determines an average domain name log-length by determining log 10(1+the average domain name length of the first set of fully-qualified domain names); and rounds the digit character ratio, the entropy, and the average domain name log-length according to predetermined precision parameters.

In some aspects, fingerprint generation component 220 determines a set of parameters, where the set of parameters are determined by: loading labeled training data including a group of fully-qualified domain names known to have been generated by a particular malware strain; looping over all possible parameter settings (n1=1 . . . 10, n2=1 . . . 10, n3=1 . . . 10); computing a respective label for each of the possible parameter settings; determining a percent of labels in the group not found in another group for each respective computed label; determining a percent of non-unique labels within the group for each respective computed label; determining a value H, where $H=P*Q-0.01*\log(n1+n2+n3)$ for each respective computed label, where P is the percent of labels in the group not found in the other group, and where Q is the percent of non-unique labels within the group; and preserving a parameter set (n1, n2, n3) that maximizes the value H. In some aspects, the generating of the fingerprint includes generating the fingerprint in response to a stateless function call.

Figure 3:
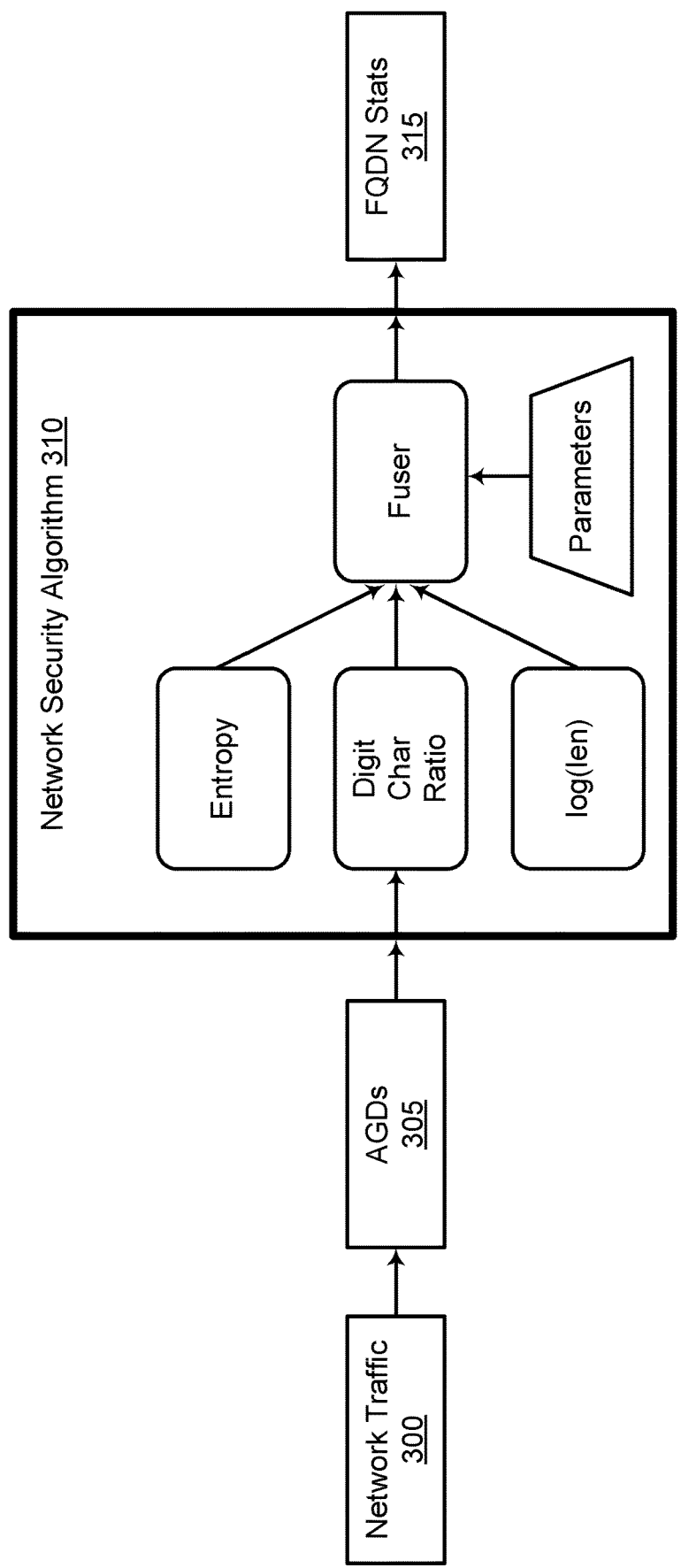
FIG. 3 shows an example of a network security block diagram according to aspects of the present disclosure.

FIG. 3 shows an example of a network security block diagram according to aspects of the present disclosure. The example shown includes network traffic 300, AGDs 305, network security algorithm 310 (e.g., a FQDN stats algorithm), and FQDN stats 315. In some aspects, network security algorithm 310 may be implemented via a device as described with reference to FIGS. 1 and 2. For example, a computer network interface of a device may collect FQDNs (e.g., AGDs 305) from related network traffic 300 (e.g., via a computer network), and the device may implement network security algorithm 310 to produce a value (e.g., via FQDN stats 315) that may be used to reliably correlate different groups of AGDs 305 back to the original generating family.

Network security algorithm 310 (e.g., network security software) may include code to implement aspects of the present disclosure. Network security algorithm 310 may be stored in a non-transitory computer-readable medium such as system memory or other memory. In some cases, the network security algorithm 310 may not be directly executable by the processor but may cause a computer (e.g., when compiled and executed) to perform functions described herein.

Network security algorithm 310 may implement several parameters that control the granularity of the values (e.g., FQDN stats 315) produced. More granular settings result in more narrow correlations while less granular settings produce more broad correlations. Network security algorithm 310 together with its possible parameters thus describe a family of methods that strike different tradeoffs with respect to false positive rate (FPR) and true positive rate (TPR).

In some aspects, historical DGA, DNS tunneling, and benign domain data may be used to identify parameters that strike an optimal balance between false positives and true positives. Such parameters may consistently be optimal across numerous different data sources and families (e.g., including the solarwinds DNS tunneling variant).

In some aspects, as described in more detail herein, network security algorithm 310 may take the entropy of the list of domains measured in thousandths, the digit character ratio measured in tenths, and log-length measured in thousandths.

In order to tune network security algorithm 310, a labeled set of training data may be obtained. The training data may include groups of AGDs that are produced from different strains of malware. In some aspects, a group of AGDs may refer to a collection of AGDs generated by the same underlying malware strain (e.g., analogous to a class label in a multi-classification problem).

As an example, 20 different malware strains that produce algorithmically generated domains may be taken, and 20 different AGD samples from each one may be obtained. The resulting dataset may include, for example, 400 domains that belong to 20 different groups.

Supervised learning is a learning paradigm. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

Between-group heterogeneity refers to differences (or lack thereof) observed between groups when comparing the true labeling (derived from knowledge of the underlying malware strain) to the computed labels (derived from the network security algorithm 310). In this case, more between-group heterogeneity (higher Q value) is better as it implies a greater amount of separability between malware strains (Sample A from Family X and Sample B from Family Y tend to have different labels).

Within-group homogeneity refers to similarities (or lack thereof) observed inside the same group when comparing the true labeling (derived from knowledge of the underlying malware strain) to the computed label (derived from the network security algorithm 310). In this case, more within-group homogeneity (higher P value) is better as it implies a greater amount of similarity in labeling AGDs from the same malware strain (Sample A from Family X and Sample B also from Family X tend to have the same label).

In some aspects, network security algorithm 310 has components including entropy, digit character ratio (e.g., Digit/Char Ratio), and average domain name log-length (e.g., log(len)). The number of decimal digits of precision preserved for each of these components comprise the free parameters of the algorithm (e.g., parameters). Let the number of digits of precision used by each of entropy, digit character ratio, and average domain name log-length be $n1$, $n2$, and $n3$ respectively. The set of parameters that specifies the algorithm is then $\{n1, n2, n3\}$.

Thus the optimization step is to select $n1$, $n2$, and $n3$ that simultaneously minimizes the homogeneity within each group and maximizes the heterogeneity between groups.

To approximate this maximization, two scores P and Q are computed, where P is the percent of labels in a group not found in other group and Q is the percent of non-unique labels within a group. Further, P measures between-group heterogeneity and Q measures within-group homogeneity. The final heuristic score is then taken as:

$$H = P*Q - 0.01*\log(n1+n2+n3)$$

The final logarithmic term is a regularization term to make the training procedure slightly prefer (e.g., more likely result in) smaller values of $n1$, $n2$, and $n3$.

In some aspects (e.g., as the number of digits to preserve for $n1$, $n2$, and $n3$ may be somewhat limited), exhaustive search over all candidates is possible. For example, given three components of the network security algorithm 310, a maximum of 10 decimal digits of precision for each component may be considered. Thus there may be 10*10*10=1000 possible candidates.

As an example, the training data may comprise 584 domains across 47 malware strains with an average of 12.4 domains per strain. This dataset includes AGDs (e.g., that may be generated from malware, such as the solarwinds malware (DNS-Tunneling) in addition to a number of common DGA malware strains).

The above heuristic score H may be computed for each of the 1000 candidate parameter settings using bootstrapped samples drawn from this dataset. The result of the optimization is shown in Table 1.

TABLE 1

| n1 | n2 | n3 | P | Q | H | |
|---|---|---|---|---|---|---|
| 0 | 0 | 0 | 0.0% | 98.2% | −0.5% | |
| 0 | 0 | 1 | 12.1% | 98.2% | 10.8% | |
| 0 | 0 | 2 | 39.3% | 96.3% | 35.8% | |
| 0 | 0 | 3 | 64.3% | 86.7% | 52.7% | |
| 0 | 1 | 2 | 76.8% | 95.3% | 71.1% | |
| 0 | 2 | 2 | 86.0% | 87.1% | 72.6% | |
| 1 | 1 | 2 | 80.0% | 94.7% | 73.7% | |
| 2 | 1 | 2 | 90.2% | 88.2% | 77.2% | ← Optimization Complete |

As can be seen in Table 1, the optimal settings are found when n1=2, n2=1, and n3=2. This corresponds to 2 digits of precision for entropy, 1 digit of precision for the Digit/Char ratio (i.e. the digit character ratio), and 1 digit of precision for the average domain name log-length.

In some examples, network security algorithm 310 may be implemented in a module that ingests data into a database. This function may apply labels to incoming detection data, labeling any detected AGDs that are present in events. Using these labels, analysts are able to query for any AGDs that, with high-probability, are generated using the same strain of malware.

Because of the randomized nature of DGA, it may be likely that two environments hit with the same malware strain may not produce a detection with the exact same domain name. The techniques described herein allow analysts and network security systems to identify network environments that may be hit by the same malware outbreak, without having an exact domain to correlate.

Further, one or more aspects of the present disclosure allows for the automatic grouping and identification of families of DGA and DNS tunneling across disparate environments, without the need for historical training data. Obviating the need for historical data helps to alleviate the asymmetries and difficulties inherent in detecting DGA and DNS tunneling. This follows as any significantly large algorithm or configuration changes made by the attacker will simply produce new values that can then be correlated on without any modification on the defender's part.

The described systems and techniques may also be robust against changes in second-level domain (SLD)/top-level domain (TLD), allowing for the identification of the same or similar families across significant changes to the FQDN structure. Further, the stateless nature of the algorithm allows for easy distributed processing and thus can be run at nearly any scale.

Figure 4:
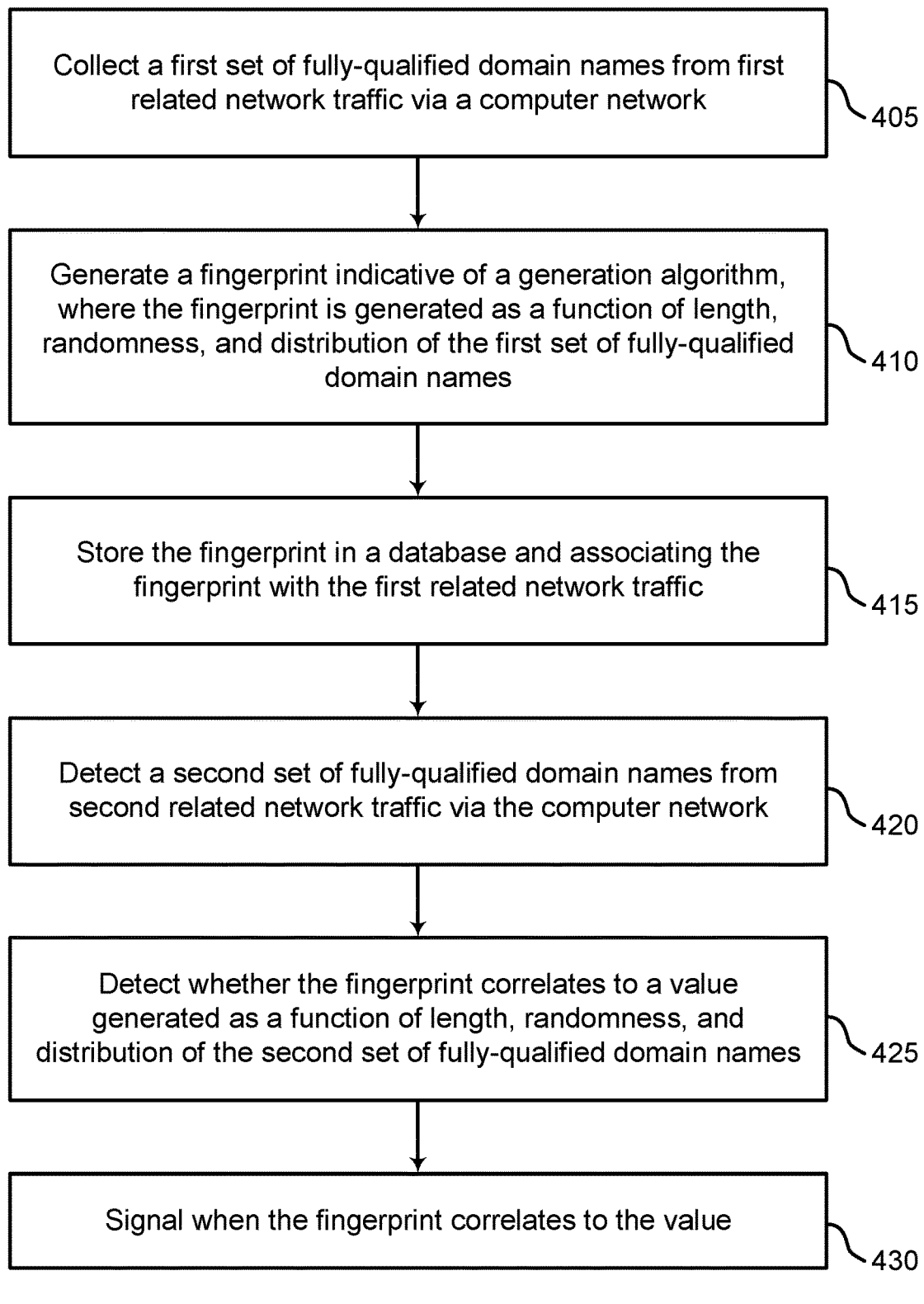
FIGS. 4 through 6 show example processes for network security according to aspects of the present disclosure.

FIG. 4 shows an example of a process 400 for network security according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system collects a first set of fully-qualified domain names from first related network traffic via a computer network. In some cases, the operations of this step refer to, or may be performed by, a computer network interface as described with reference to FIGS. 1 and 2.

At operation 410, the system generates a fingerprint indicative of a generation algorithm, where the fingerprint is generated as a function of length, randomness, and character distribution of the first set of fully-qualified domain names. In some cases, the operations of this step refer to, or may be performed by, a fingerprint generation component as described with reference to FIG. 2. In some cases, the operations of this step refer to, or may be performed by, a network security algorithm as described with reference to FIG. 3.

At operation 415, the system stores the fingerprint in a database and associating the fingerprint with the first related network traffic. In some cases, the operations of this step refer to, or may be performed by, a database as described with reference to FIG. 1.

At operation 420, the system detects a second set of fully-qualified domain names from second related network traffic via the computer network. In some cases, the operations of this step refer to, or may be performed by, another computer network interface as described with reference to FIG. 1.

At operation 425, the system detects whether the fingerprint correlates to a value generated as a function of length, randomness, and character distribution of the second set of fully-qualified domain names. In some cases, the operations of this step refer to, or may be performed by, a processor as described with reference to FIGS. 1 and 2.

At operation 430, the system signals when the fingerprint correlates to the value. In some cases, the operations of this step refer to, or may be performed by, a processor as described with reference to FIGS. 1 and 2.

Figure 5:
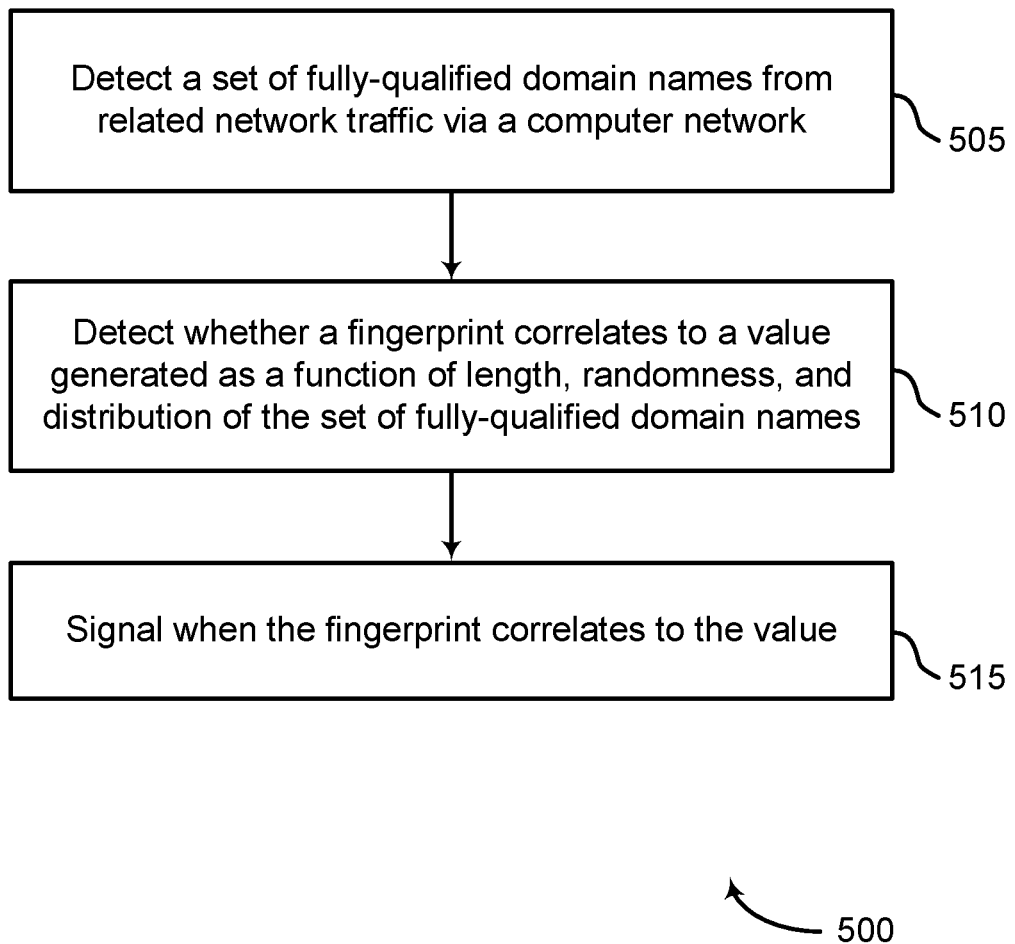

FIG. 5 shows an example of a process 500 for network security according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system detects a set of fully-qualified domain names from related network traffic via a computer network. In some cases, the operations of this step refer to, or may be performed by, a computer network interface as described with reference to FIGS. 1 and 2.

At operation 510, the system detects whether a fingerprint correlates to a value generated as a function of length, randomness, and character distribution of the set of fully-qualified domain names. In some cases, the operations of this step refer to, or may be performed by, a processor as described with reference to FIGS. 1 and 2.

At operation 515, the system signals when the fingerprint correlates to the value. In some cases, the operations of this step refer to, or may be performed by, a processor as described with reference to FIGS. 1 and 2.

Figure 6:
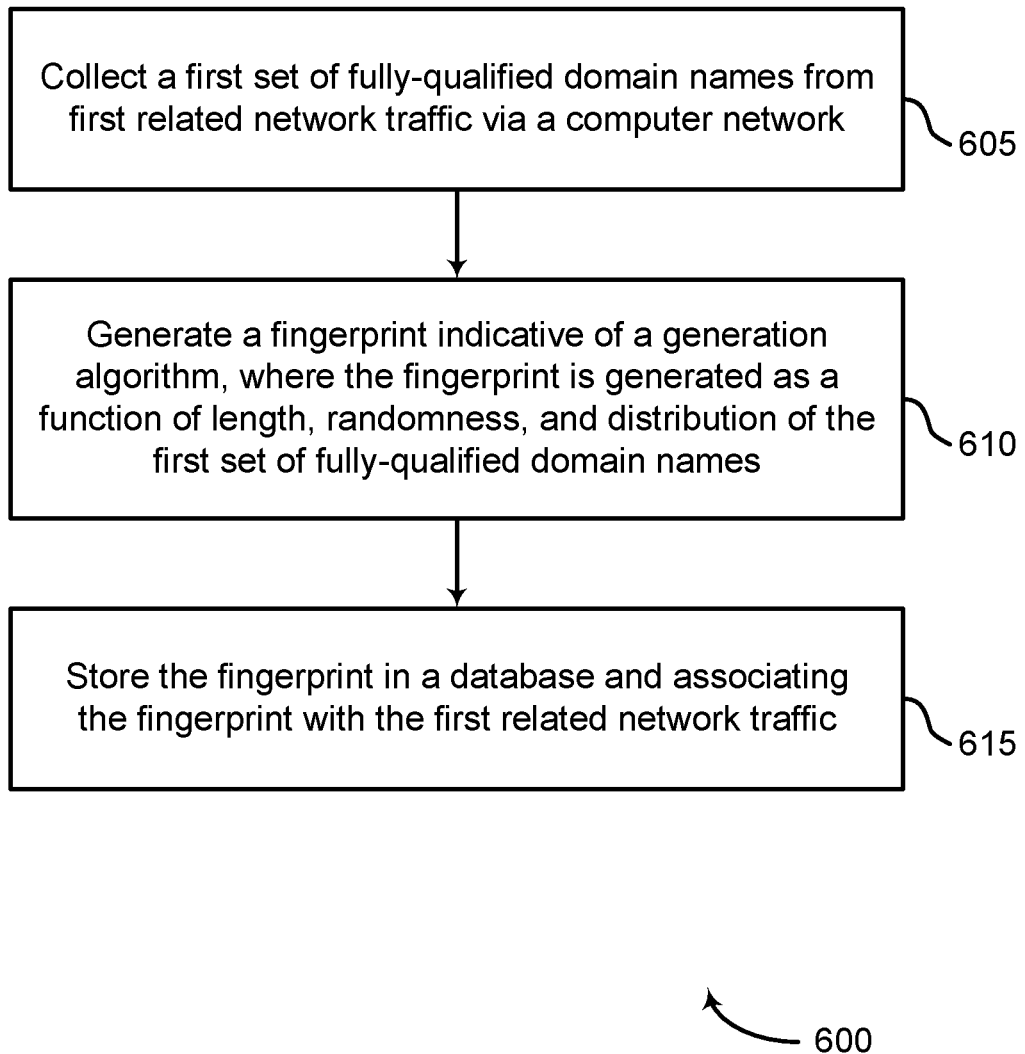

FIG. 6 shows an example of a process 600 for network security according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system collects a first set of fully-qualified domain names from first related network traffic via a computer network. In some cases, the operations of this step refer to, or may be performed by, a computer network interface as described with reference to FIGS. 1 and 2.

At operation 610, the system generates a fingerprint indicative of a generation algorithm, where the fingerprint is generated as a function of length, randomness, and character distribution of the first set of fully-qualified domain names. In some cases, the operations of this step refer to, or may be performed by, a fingerprint generation component as described with reference to FIG. 2. In some cases, the operations of this step refer to, or may be performed by, a network security algorithm as described with reference to FIG. 3.

At operation 615, the system stores the fingerprint in a database and associating the fingerprint with the first related network traffic. In some cases, the operations of this step refer to, or may be performed by, a database as described with reference to FIG. 1.

Accordingly, the present disclosure includes the following aspects.

A method, apparatus, non-transitory computer readable medium, and system for automatic identification of algorithmically generated domain families is described. One or more aspects of the method, apparatus, non-transitory computer readable medium, and system include collecting a first plurality of fully-qualified domain names from first related network traffic via a computer network; generating a fingerprint indicative of a generation algorithm, wherein the fingerprint is generated as a function of length, randomness, and character distribution of the first plurality of fully-qualified domain names and utilizing a set of precision parameters; storing the fingerprint in a database and associating the fingerprint with the first related network traffic; detecting a second plurality of fully-qualified domain names from second related network traffic via the computer network; detecting whether the fingerprint correlates to a value generated as a function of length, randomness, and character distribution of the second plurality of fully-qualified domain names and utilizing the set of precision parameters; and signaling when the fingerprint correlates to the value.

Some examples of the method, apparatus, non-transitory computer readable medium, and system further include adjusting a granularity of the value.

Some examples of the method, apparatus, non-transitory computer readable medium, and system further include generating the value by taking an entropy of the second plurality of fully-qualified domain names in thousandths, digit character ratio measured in tenths, and log-length measured in thousandths.

In some aspects, the generating of the fingerprint comprises steps of: determining a number of digit characters, a number of non-digit characters, and a total number of characters in each of the first plurality of fully-qualified domain names; determining a digit character ratio comprising $((nc-nd)/(nc+nd)+1)/2$, wherein nc is the number of digit characters, and nd is the number of non-digit characters; determining an entropy over all domains of the first plurality of fully-qualified domain names, and dividing the entropy over all domains of the first plurality of fully-qualified domain names by a maximum possible entropy achievable; determining an average domain name length of the first plurality of fully-qualified domain names; determining an average domain name log-length by determining $\log 10(1+$ the average domain name length of the first plurality of fully-qualified domain names); and rounding the digit character ratio, the entropy, and the average domain name log-length according to predetermined precision parameters.

In some aspects, the generating of the fingerprint comprises determining a set of precision parameters, where the set of precision parameters are determined by: loading labeled training data comprising a group of fully-qualified domain names known to have been generated by a particular malware strain; looping over all possible parameter settings $(n1=1 \ldots 10, n2=1 \ldots 10, n3=1 \ldots 10)$; computing a respective label for each of the possible parameter settings; determining a percent of labels in the group not found in another group for each respective computed label; determining a percent of non-unique labels within the group for each respective computed label; determining a value H, where $H=P*Q-0.01*\log(n1+n2+n3)$ for each respective computed label, wherein P is the percent of labels in the group not found in the other group, and wherein Q is the percent of non-unique labels within the group; and preserving a parameter set $(n1, n2, n3)$ that maximizes the value H.

In some aspects, the generating of the fingerprint comprises generating the fingerprint in response to a stateless function call.

An apparatus and system for automatic identification of algorithmically generated domain families is described. One or more aspects of the apparatus and system include a database storing a fingerprint and associating the fingerprint with first related network traffic from a computer network; a computer network interface coupled to a plurality of fully-qualified domain names from second related network traffic on the computer network; and a processor coupled to the computer network interface and comprising a code segment for performing the following steps: detecting whether the fingerprint correlates to a value generated as a function of length, randomness, and character distribution of the plurality of fully-qualified domain names; and signaling when the fingerprint correlates to the value.

In some aspects, the processor comprises the code segment for performing the additional step of: adjusting a granularity of the value.

In some aspects, the processor comprises the code segment for performing the additional step of: generating the value by taking an entropy of the plurality of fully-qualified domain names in thousandths, digit character ratio measured in tenths, and log-length measured in thousandths.

Some examples of the apparatus and system further include another computer network interface coupled to another plurality of fully-qualified domain names from the first related network traffic on the computer network. Some examples further include another processor coupled to the another computer network interface and comprising another code segment code for performing the step of: generating the fingerprint indicative of a generation algorithm, wherein the fingerprint is generated as a function of length, randomness, and character distribution of the other plurality of fully-qualified domain names and utilizing the set of precision parameters.

In some aspects, the processor comprises the code segment for performing the additional steps of: determining a number of digit characters, a number of non-digit characters, and a total number of characters in each of the other plurality of fully-qualified domain names; determining a digit character ratio comprising $((nc-nd)/(nc+nd)+1)/2$, wherein nc is the number of digit characters, and nd is the number of non-digit characters; determining an entropy over all domains of the other plurality of fully-qualified domain names, and dividing the entropy over all domains of the other plurality of fully-qualified domain names by a maximum possible entropy achievable; determining an average domain length of the other plurality of fully-qualified domain names; determining an average domain name log-length by determining log 10(1+the average domain name length of the other plurality of fully-qualified domain names); and rounding the digit character ratio, the entropy, and the average domain name log-length according to predetermined precision parameters.

In some aspects, the processor comprises the code segment for performing the additional step of determining a set of parameters, wherein the set of parameters are determined by: loading labeled training data comprising a group of fully-qualified domain names known to have been generated by a particular malware strain; looping over all possible parameter settings (n1=1 ... 10, n2=1 ... 10, n3=1 ... 10); computing a respective label for each of the possible parameter settings; determining a percent of labels in the group not found in another group for each respective computed label; determining a percent of non-unique labels within the group for each respective computed label; determining a value H, where H=P*Q−0.01*log (n1+n2+n3) for each respective computed label, wherein P is the percent of labels in the group not found in the other group, and wherein Q is the percent of non-unique labels within the group; and preserving a parameter set (n1, n2, n3) that maximizes the value H.

In some aspects, the generating of the fingerprint comprises generating the fingerprint in response to a stateless function call.

A method, apparatus, non-transitory computer readable medium, and system for automatic identification of algorithmically generated domain families is described. One or more aspects of the method, apparatus, non-transitory computer readable medium, and system include detecting a plurality of fully-qualified domain names from related network traffic via a computer network; detecting whether a fingerprint correlates to a value generated as a function of length, randomness, and character distribution of the plurality of fully-qualified domain names and utilizing a set of precision parameters; and signaling when the fingerprint correlates to the value.

Some examples of the method, apparatus, non-transitory computer readable medium, and system further include adjusting a granularity of the value.

Some examples of the method, apparatus, non-transitory computer readable medium, and system further include generating the value by taking an entropy of the plurality of fully-qualified domain names in thousandths, digit character ratio measured in tenths, and log-length measured in thousandths.

Some examples of the method, apparatus, non-transitory computer readable medium, and system further include collecting another plurality of fully-qualified domain names from another related network traffic via the computer network. Some examples further include generating the fingerprint indicative of a generation algorithm, wherein the fingerprint is generated as a function of length, randomness, and character distribution of the other plurality of fully-qualified domain names and utilizing the set of precision parameters. Some examples further include storing the fingerprint in a database and associating the fingerprint with the other related network traffic.

In some aspects, the generating of the fingerprint comprises steps of: determining a number of digit characters, a number of non-digit characters, and a total number of characters in each of the other plurality of fully-qualified domain names; determining a digit character ratio comprising ((nc−nd)/(nc+nd)+1)/2, wherein nc is the number of digit characters, and nd is the number of non-digit characters; determining an entropy over all domains of the other plurality of fully-qualified domain names, and dividing the entropy over all domains of the other plurality of fully-qualified domain names by a maximum possible entropy achievable; determining an average domain name length of the other plurality of fully-qualified domain names; determining an average domain name log-length by determining log 10(1+the average domain name length of the other plurality of fully-qualified domain names); and rounding the digit character ratio, the entropy, and the average domain name log-length according to the predetermined precision parameters.

In some aspects, the generating of the fingerprint comprises determining a set of parameters, where the set of parameters are determined by: loading labeled training data comprising a group of fully-qualified domain names known to have been generated by a particular malware strain; looping over all possible parameter settings (n1=1 ... 10, n2=1 ... 10, n3=1 ... 10); computing a respective label for each of the possible parameter settings; determining a percent of labels in the group not found in another group for each respective computed label; determining a percent of non-unique labels within the group for each respective computed label; determining a value H, where H=P*Q−0.01*log(n1+n2+n3) for each respective computed label, wherein P is the percent of labels in the group not found in the other group, and wherein Q is the percent of non-unique labels within the group; and preserving a parameter set (n1, n2, n3) that maximizes the value H.

In some aspects, the generating of the fingerprint comprises generating the fingerprint in response to a stateless function call.

A method, apparatus, non-transitory computer readable medium, and system for automatic identification of algorithmically generated domain families is described. One or more aspects of the method, apparatus, non-transitory computer readable medium, and system include collecting a first plurality of fully-qualified domain names from first related network traffic via a computer network; generating a fingerprint indicative of a generation algorithm, wherein the fingerprint is generated as a function of length, randomness, and character distribution of the first plurality of fully-qualified domain names and utilizing a set of precision parameters; and storing the fingerprint in a database and associating the fingerprint with the first related network traffic.

Some examples of the method, apparatus, non-transitory computer readable medium, and system further include detecting a second plurality of fully-qualified domain names from second related network traffic via the computer network. Some examples further include detecting whether the fingerprint correlates to a value generated as a function of length, randomness, and character distribution of the second plurality of fully-qualified domain names and utilizing the set of precision parameters. Some examples further include signaling when the fingerprint correlates to the value.

Some examples of the method, apparatus, non-transitory computer readable medium, and system further include adjusting a granularity of the value.

Some examples of the method, apparatus, non-transitory computer readable medium, and system further include generating the value by taking an entropy of the second plurality of fully-qualified domain names in thousandths, digit character ratio measured in tenths, and log-length measured in thousandths.

In some aspects, the generating of the fingerprint comprises steps of: determining a number of digit characters, a number of non-digit characters, and a total number of characters in each of the first plurality of fully-qualified domain names; determining a digit character ratio comprising ((nc−nd)/(nc+nd)+1)/2, wherein nc is the number of digit characters, and nd is the number of non-digit characters; determining an entropy over all domains of the first plurality of fully-qualified domain names, and dividing the entropy over all domains of the first plurality of fully-qualified domain names by a maximum possible entropy achievable; determining an average domain name length of the first plurality of fully-qualified domain names; determining an average domain name log-length by determining log 10(1+ the average domain name length of the first plurality of fully-qualified domain names); and rounding the digit character ratio, the entropy, and the average domain name log-length according to the predetermined precision parameters.

In some aspects, the generating of the fingerprint comprises determining a set of parameters, where the set of parameters are determined by: loading labeled training data comprising a group of fully-qualified domain names known to have been generated by a particular malware strain; looping over all possible parameter settings (n1=1 . . . 10, n2=1 . . . 10, n3=1 . . . 10); for each of the possible parameter settings, computing a respective label; determining a percent of labels in the group not found in another group for each respective computed label; determining a percent of non-unique labels within the group for each respective computed label; and determining a value H, where H=P*Q−0.01*log (n1+n2+n3) for each respective computed label, wherein P is the percent of labels in the group not found in the other group, and wherein Q is the percent of non-unique labels within the group; and preserving a parameter set (n1, n2, n3) that maximizes the value H.

In some aspects, the generating of the fingerprint comprises generating the fingerprint in response to a stateless function call.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of signaling a detecting of automatic identification of algorithmically generated domain names comprising:
   collecting a first plurality of fully-qualified domain names from first related network traffic via a computer network;
   generating a fingerprint indicative of a generation algorithm, wherein the fingerprint is generated as a function of length, randomness, and character distribution of the first plurality of fully-qualified domain names and utilizing a set of precision parameters, wherein said generating of said fingerprint comprises steps of:
      determining a number of digit characters, a number of non-digit characters, and a total number of characters in each of the first plurality of fully-qualified domain names;
      determining a digit character ratio comprising ((nc−nd)/(nc+nd)+1)/2, wherein nc is the number of digit characters, and nd is the number of non-digit characters;
      determining an entropy over all domains of the first plurality of fully-qualified domain names, and dividing the entropy over all domains of the first plurality of fully-qualified domain names by a maximum possible entropy achievable;
      determining an average domain name length of said first plurality of fully-qualified domain names;
      determining an average domain name log-length by determining log 10(1+the average domain name length of said first plurality of fully-qualified domain names); and
      rounding the digit character ratio, the entropy, and the average domain name log-length according to the set of precision parameters;
   storing the fingerprint in a database and associating the fingerprint with the first related network traffic;
   detecting a second plurality of fully-qualified domain names from second related network traffic via the computer network;
   detecting whether the fingerprint correlates to a value generated as a function of length, randomness, and character distribution of the second plurality of fully-qualified domain names and utilizing the set of precision parameters;
   signaling when the fingerprint correlates to the value.

2. The method of claim 1 further comprising:
   adjusting a granularity of the value.

3. The method of claim 2 further comprising:
   generating said value by taking an entropy of the second plurality of fully-qualified domain names in thousandths, a digit character ratio measured in tenths, and log-length measured in thousandths.

4. The method of claim 1 wherein said generating of said fingerprint comprises steps of:

determining the set of precision parameters comprising:
loading labeled training data comprising a group of fully-qualified domain names known to have been generated by a particular malware strain;
looping over all possible parameter settings (n1=1 . . . 10, n2=1 . . . 10, n3=1 . . . 10);
for each of the possible parameter settings, computing a respective label;
for each respective computed label, determining:
a percent of labels in the group not found in another group;
a percent of non-unique labels within the group; and
a value H, where H=P*Q−0.01*log(n1+n2+n3), wherein P is the percent of labels in the group not found in the other group, and wherein Q is the percent of non-unique labels within the group;
preserving the set of precision parameters comprising a parameter set (n1, n2, n3) that maximizes the value H.

5. The method of claim 1 wherein said generating of said fingerprint comprises generating said fingerprint in response to a stateless function call.

6. A system for signaling a detecting of automatic identification of algorithmically generated domain names comprising:
a database storing a fingerprint and associating the fingerprint with first related network traffic from a computer network;
a computer network interface coupled to a plurality of fully-qualified domain names from second related network traffic on the computer network; and
a processor coupled to the computer network interface and comprising a code segment for performing the following steps:
detecting whether the fingerprint correlates to a value generated as a function of length, randomness, and character distribution of the plurality of fully-qualified domain names and utilizing a set of precision parameters; and
signaling when the fingerprint correlates to the value, wherein the system further comprises:
another computer network interface coupled to another plurality of fully-qualified domain names from the first related network traffic on the computer network;
another processor coupled to the other computer network interface and comprising another code segment for performing the following step:
generating the fingerprint indicative of a generation algorithm, wherein the fingerprint is generated as a function of length, randomness, and character distribution of the other plurality of fully-qualified domain names and utilizing the set of precision parameters, wherein the generating the fingerprints comprises the steps of:
determining a number of digit characters, a number of non-digit characters, and a total number of characters in each of the other plurality of fully-qualified domain names;
determining a digit character ratio comprising ((nc−nd)/(nc+nd)+1)/2, wherein nc is the number of digit characters, and nd is the number of non-digit characters;
determining an entropy over all domains of the other plurality of fully-qualified domain names, and dividing the entropy over all domains of the other plurality of fully-qualified domain names by a maximum possible entropy achievable;
determining an average domain name length of said other plurality of fully-qualified domain names;
determining an average domain name log-length by determining log 10(1+the average domain name length of said other plurality of fully-qualified domain names); and
rounding the digit character ratio, the entropy, and the average domain name log-length according to the set of precision parameters.

7. The system of claim 6 further comprising said processor comprising said code segment for performing the following additional step:
adjusting a granularity of the value.

8. The system of claim 7 further comprising said processor comprising said code segment for performing the following additional step:
generating said value by taking an entropy of the plurality of fully-qualified domain names in thousandths, digit character ratio measured in tenths, and log-length measured in thousandths.

9. The system of claim 6 further comprising said processor comprising said other code segment for performing the following additional steps:
determining the set of precision parameters comprising:
loading labeled training data comprising a group of fully-qualified domain names known to have been generated by a particular malware strain;
looping over all possible parameter settings (n1=1 . . . 10, n2=1 . . . 10, n3=1 . . . 10);
for each of the possible parameter settings, computing a respective label;
for each respective computed label, determining:
a percent of labels in the group not found in another group;
a percent of non-unique labels within the group; and
a value H, where H=P*Q−0.01*log(n1+n2+n3), wherein P is the percent of labels in the group not found in the other group, and wherein Q is the percent of non-unique labels within the group;
preserving the set of precision parameters comprising a parameter set (n1, n2, n3) that maximizes the value H.

10. The system of claim 6 comprising said processor comprising said other code segment wherein said generating of said fingerprint comprises generating said fingerprint in response to a stateless function call.

11. A method of signaling a detecting of automatic identification of algorithmically generated domain names comprising:
detecting a plurality of fully-qualified domain names from related network traffic via a computer network;
detecting whether a fingerprint correlates to a value generated as a function of length, randomness, and character distribution of the plurality of fully-qualified domain names and utilizing a set of precision parameters;
signaling when the fingerprint correlates to the value, wherein the method further comprises:
collecting another plurality of fully-qualified domain names from another related network traffic via the computer network;
generating the fingerprint indicative of a generation algorithm, wherein the fingerprint is generated as a function of length, randomness, and character distribution of the other plurality of fully-qualified domain names and utilizing the set of precision parameters, wherein said generating of said fingerprint comprises steps of:

determining a number of digit characters, a number of non-digit characters, and a total number of characters in each of the other plurality of fully-qualified domain names;

determining a digit character ratio comprising $((n\varepsilon\text{-}nd)/(nc+nd)+1)/2$, wherein nc is the number of digit characters, and nd is the number of non-digit characters;

determining an entropy over all domains of the other plurality of fully-qualified domain names, and dividing the entropy over all domains of the other plurality of fully-qualified domain names by a maximum possible entropy achievable;

determining an average domain name length of said other plurality of fully-qualified domain names;

determining an average domain name log-length by determining log 10(1+the average domain name length of said other plurality of fully-qualified domain names); and rounding the digit character ratio, the entropy, and the average domain name log-length according to the set of precision parameters; and storing the fingerprint in a database and associating the fingerprint with the related network traffic.

12. The method of claim 11 further comprising:
adjusting a granularity of the value.

13. The method of claim 12 further comprising:
generating said value by taking an entropy of the plurality of fully-qualified domain names in thousandths, digit character ratio measured in tenths, and log-length measured in thousandths.

14. The method of claim 11 wherein said generating of said fingerprint comprises steps of:
determining the set of precision parameters comprising:
loading labeled training data comprising a group of fully-qualified domain names known to have been generated by a particular malware strain;
looping over all possible parameter settings (n1=1 . . . 10, n2=1 . . . 10, n3=1 . . . 10);
for each of the possible parameter settings, computing a respective label;
for each respective computed label, determining:
a percent of labels in the group not found in another group;
a percent of non-unique labels within the group; and
a value H, where $H=P*Q-0.01*\log(n1+n2+n3)$, wherein P is the percent of labels in the group not found in the other group, and wherein Q is the percent of non-unique labels within the group;
preserving the set of precision parameters comprising a parameter set (n1, n2, n3) that maximizes the value H.

15. The method of claim 11 wherein said generating of said fingerprint comprises generating said fingerprint in response to a stateless function call.

16. A method of signaling a detecting of automatic identification of algorithmically generated domain names comprising:
collecting a first plurality of fully-qualified domain names from first related network traffic via a computer network;
generating a fingerprint indicative of a generation algorithm, wherein the fingerprint is generated as a function of length, randomness, and character distribution of the first plurality of fully-qualified domain names and utilizing a set of precision parameters, wherein said generating of said fingerprint comprises steps of:

determining a number of digit characters, a number of non-digit characters, and a total number of characters in each of the first plurality of fully-qualified domain names;

determining a digit character ratio comprising $((nc-nd)/(nc+nd)+1)/2$, wherein nc is the number of digit characters, and nd is the number of non-digit characters;

determining an entropy over all domains of the first plurality of fully-qualified domain names, and dividing the entropy over all domains of the first plurality of fully-qualified domain names by a maximum possible entropy achievable;

determining an average domain name length of said first plurality of fully-qualified domain names;

determining an average domain name log-length by determining log 10(1+the average domain name length of said first plurality of fully-qualified domain names); and rounding the digit character ratio, the entropy, and the average domain name log-length according to the set of precision parameters;

storing the fingerprint in a database and associating the fingerprint with the first related network traffic.

17. The method of claim 16 further comprising:
detecting a second plurality of fully-qualified domain names from second related network traffic via the computer network;
detecting whether the fingerprint correlates to a value generated as a function of length, randomness, and character distribution of the second plurality of fully-qualified domain names and utilizing the set of precision parameters;
signaling when the fingerprint correlates to the value.

18. The method of claim 17 further comprising:
adjusting a granularity of the value.

19. The method of claim 18 further comprising:
generating said value by taking an entropy of the second plurality of fully-qualified domain names in thousandths, digit character ratio measured in tenths, and log-length measured in thousandths.

20. The method of claim 16 wherein said generating of said fingerprint comprises steps of:
determining the set of precision parameters comprising:
loading labeled training data comprising a group of fully-qualified domain names known to have been generated by a particular malware strain;
looping over all possible parameter settings (n1=1 . . . 10, n2=1 . . . 10, n3=1 . . . 10);
for each of the possible parameter settings, computing a respective label;
for each respective computed label, determining:
a percent of labels in the group not found in another group;
a percent of non-unique labels within the group; and
a value H, where $H=P*Q-0.01*\log(n1+n2+n3)$, wherein P is the percent of labels in the group not found in the other group, and wherein Q is the percent of non-unique labels within the group;
preserving the set of precision parameters comprising a parameter set (n1, n2, n3) that maximizes the value H.

21. The method of claim 16 wherein said generating of said fingerprint comprises generating said fingerprint in response to a stateless function call.

* * * * *